(12) United States Patent  
Okamoto et al.

(10) Patent No.: US 7,009,026 B2  
(45) Date of Patent: Mar. 7, 2006

(54) METHOD FOR PRODUCING A LIQUID CRYSTALLINE POLYESTER AND THE LIQUID CRYSTALLINE POLYESTER

(75) Inventors: Satoshi Okamoto, Tsukuba (JP); Manabu Hirakawa, Funabashi (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/647,379

(22) Filed: Aug. 26, 2003

(65) Prior Publication Data

US 2004/0044171 A1    Mar. 4, 2004

(30) Foreign Application Priority Data

Aug. 28, 2002   (JP)   ............................. 2002-248409

(51) Int. Cl.  
   C08G 63/00    (2006.01)  
   C08K 5/16     (2006.01)

(52) U.S. Cl. .................. 528/190; 528/181; 528/182; 528/185; 528/194; 524/714; 524/783

(58) Field of Classification Search ............... 528/181, 528/182, 185, 190, 194; 524/714, 783  
See application file for complete search history.

(56) References Cited

U.S. PATENT DOCUMENTS 5,084,547 A  *  1/1992  Pielartzik et al. ........... 528/171

5,408,347 A  *  4/1995  Murakami et al. .......... 349/132

FOREIGN PATENT DOCUMENTS

JP          2002-3583 A       1/2002

* cited by examiner

*Primary Examiner*—Samuel A. Acquah  
(74) *Attorney, Agent, or Firm*—Sughrue Mion, PLLC

(57) ABSTRACT

The object is to provide liquid crystalline polyester which gives molded articles without generating acetic acid gas, and a method for producing the liquid crystalline polyester. This object is achieved by a method for producing a liquid crystalline polyester comprising melt-polymerizing aromatic hydroxycarboxylic acid represented by the formula (I), aromatic diol represented by the formula (II), and aromatic dicarboxylic acid represented by the formula (III) with using a diaryl carbonate represented by the formula (IV).

$$HO-R_1-COOH \quad (I)$$

$$HO-R_2-OH \quad (II)$$

$$HOOC-R_3-COOH \quad (III)$$

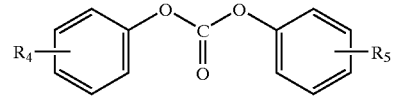

(IV)

4 Claims, 1 Drawing Sheet

METHOD FOR PRODUCING A LIQUID CRYSTALLINE POLYESTER AND THE

LIQUID CRYSTLLINE POLYESTER

METHOD FOR PRODUCING A LIQUID CRYSTALLINE POLYESTER AND THE LIQUID CRYSTLLINE POLYESTER

METHOD FOR PRODUCING A LIQUID CRYSTALLINE POLYESTER AND THE LIQUID CRYSTALLINE POLYESTER

FIELD OF THE INVENTION

The present invention relates to a liquid crystalline polyester and a method for producing thereof.

BACKGROUND OF THE INVENTION

Liquid crystalline polyester having aromatic ring has been widely used as a material with superior heat resistance and moldability in the fields of electrical engineering and electronic engineering.

The above-mentioned liquid crystalline polyester, for example, has been produced by melt-polymerizing aromatic hydroxycarboxylic acid such as para-hydroxybenzoic acid, aromatic diol such as 4,4'-dihydroxybiphenyl, and aromatic dicarboxylic acid such as terephthalic acid with the use of fatty acid anhydride such as acetic anhydride for an esterification agent.

Since acetic anhydride has been used as an esterification agent in the above-mentioned method, the acetic anhydride remaining in molded products obtained by compounding the above-mentioned liquid crystalline polyester, heating the compound and molding it, is decomposed to produce acetic acid. Alternatively, acetic acid is by-produced through additional proceedings of polymerization during compounding or molding process. Such acetic acid is vaporized to corrode metal wiring and the like.

SUMMARY OF THE INVENTION

The object of the present invention is to provide liquid crystalline polyester which gives molded articles without generating acetic acid gas, and a method for producing the liquid crystalline polyester.

The inventors of the present invention have studied for developing liquid crystalline polyester as mentioned above. As a result, the inventors have completed the present invention by finding out that melt-polymerization of aromatic hydroxycarboxylic acid, aromatic diol, and aromatic dicarboxylic acid is proceeded by using a diaryl carbonate for an esterification agent with as high yield as by using an acetic acid, and further finding out that a solid-phase polymerization described below proceed under milder conditions such as a lower reaction temperature when the diaryl carbonate is used, and that the obtained liquid crystalline polyester gives molded articles without generating carboxylic acid gas such as acetic acid gas.

That is, the present invention provides a method for producing liquid crystalline polyesters comprising melt-polymerizing aromatic hydroxycarboxylic acid represented by the formula (I), aromatic diol represented by the formula (II), and aromatic dicarboxylic acid represented by the formula (III) with using a diaryl carbonate represented by the formula (IV).

  (I)

  (II)

  (III)

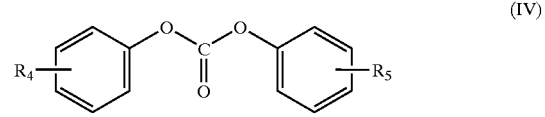

(wherein $R_1$ and $R_3$ are an optionally substituted arylene group, $R_2$ is an optionally substituted arylene group or a group represented in the following formula (V),

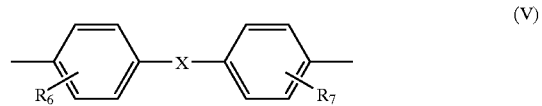

$R_4$ to $R_7$ are each independently a hydrogen atom, a halogen atom, an acyloxy group with a carbon number of from 1 to 6, or an alkyl group with a carbon number of from 1 to 6, and X is —O—, —S—, —SO$_2$—, —CO—, —C$_6$H$_{10}$—, or an alkylene group.)

Figure 1:
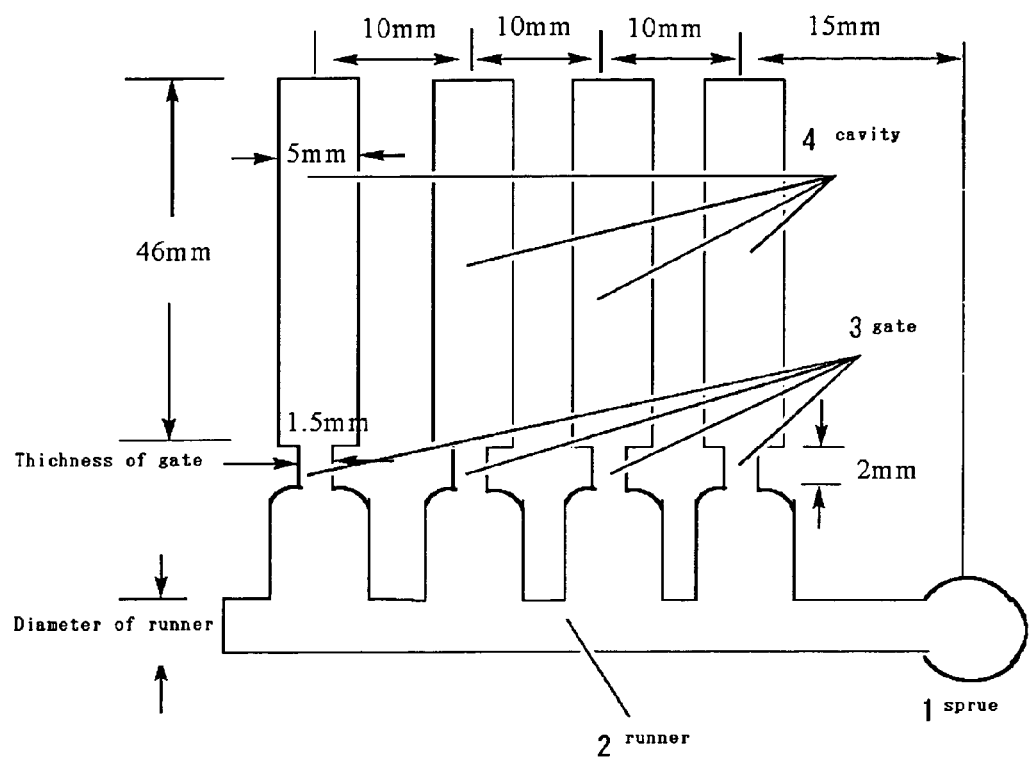
FIG. 1 is a cross-sectional view of a metal mold for measuring thin-wall flow length. The thickness of molded articles obtained by this metal mold is 0.3 mm.

1 sprue
2 runner (φ4.0 mm)
3 gate (0.3t×1.5w×2.0l)
4 cavity

DETAILED DESCRIPTION OF THE PRESENT INVENTION

Liquid crystalline polyester of the present invention can be obtained by melt-polymerizing aromatic hydroxycarboxylic acid represented by the above-mentioned formula (I), aromatic diol represented by the above-mentioned formula (II), and aromatic dicarboxylic acid represented by the above-mentioned formula (III) with the use of diaryl carbonates represented by the above-mentioned formula (IV) for an esterification agent.

In the formula (I), $R_1$ is an optionally substituted arylene group.

The arylene group includes a phenylene group, a naphthalene group, a diphenylene group, and the like. These groups are optionally substituted by a halogen atom or an alkyl group with a carbon number of from 1 to 6.

The halogen atom includes a fluorine atom, a chlorine atom, a bromine atom, an iodine atom, and the like. The alkyl group with a carbon number of from 1 to 6 includes a methyl group, an ethyl group, a propyl group, an isopropyl group, a butyl group, a tert-butyl group, and the like.

The aromatic hydroxycarboxylic acid (I) includes para-hydroxybenzoic acid, meta-hydroxybenzoic acid, 2-hydroxy-6-naphthoic acid, 2-hydroxy-3-naphthoic acid, 1-hydroxy-4-naphthoic acid, 2,6-dichloro-para-hydroxybenzoic acid, 2-chloro-para-hydroxybenzoic acid, 2,6-difluoro-para-hydroxybenzoic acid, 4-hydroxy-4'-biphenylcarboxylic acid, and the like. These may be used singly or in a combination of two or more kinds.

Among these, para-hydroxybenzoic acid and 2-hydroxy-6-naphthoic acid are preferably used from the viewpoint of their easy availability.

In the formula (II), $R_2$ is an optionally substituted arylene group or a group represented by the following formula (V).

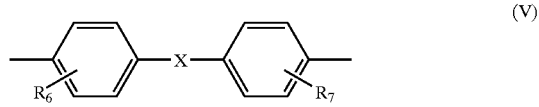

The arylene group includes a phenylene group, a naphthalene group, a diphenylene group, and the like. These groups are optionally substituted with a halogen atom, an alkyl group with a carbon number of from 1 to 6, an acyloxy group with a carbon number of from 1 to 6, a phenyl group, or a nitro group.

The halogen atom and the alkyl group with a carbon number of from 1 to 6 include similar group to the above.

The acyloxy group with a carbon number of from 1 to 6 includes a formyloxy group, an acetyloxy group (an acetoxy group), a propyloxy group, and the like.

In the formula (V), X is —O—, —S—, —SO$_2$—, —CO—, —C$_6$H$_{10}$—, or an alkylene group, and $R_6$ and $R_7$ are each independently a hydrogen atom, a halogen atom, an acyloxy group with a carbon number of from 1 to 6, or an alkyl group with a carbon number of from 1 to 6.

The halogen atom, an acyloxy group with a carbon number of from 1 to 6, and the alkyl group with a carbon number of from 1 to 6 include similar one to the above.

$R_2$ includes the following groups.

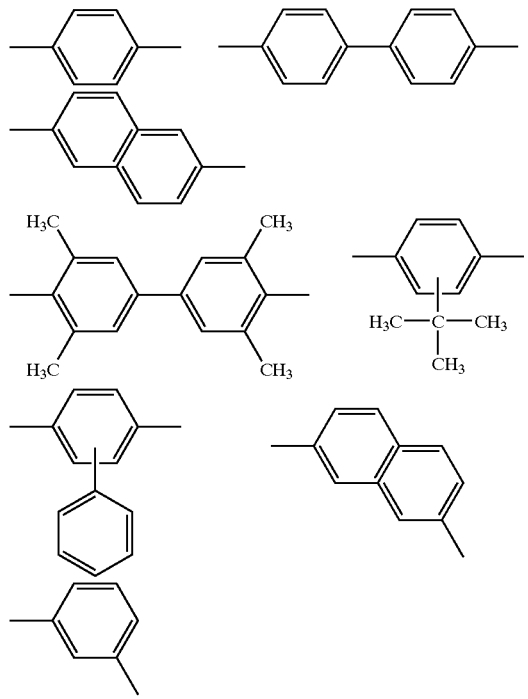

The aromatic diol (II) includes 4,4'-dihydroxybiphenyl, hydroquinone, resorcin, methylhydroquinone, chlorohydroquinone, acetoxyhydroquinone, nitrohydroquinone, 1,4-dihydroxynaphthalene, 1,5-dihydroxynaphthalene, 1,6-dihydroxynaphthalene, 2,6-dihydroxynaphthalene, 2,7-dihydroxynaphthalene, 2,2-bis(4-hydroxyphenyl)propane, 2,2-bis(4-hydroxy-3,5-dimethylphenyl)propane, 2,2-bis(4-hydroxy-3,5-dichlorophenyl)propane, 2,2-bis(4-hydroxy-3-methylphenyl)propane, 2,2-bis(4-hydroxy-3-chlorophenyl)propane, bis-(4-hydroxyphenyl)methane, bis-(4-hydroxy-3,5-dimethylphenyl)methane, bis-(4-hydroxy-3,5-dichlorophenyl)methane, bis-(4-hydroxy-3,5-dibromophenyl)methane, bis-(4-hydroxy-3-methylphenyl)methane, bis-(4-hydroxy-3-chlorophenyl)methane, 1,1-bis(4-hydroxyphenyl)cyclohexane, bis-(4-hydroxyphenyl)ketone, bis-(4-hydroxy-3,5-dimethylphenyl)ketone, bis-(4-hydroxy-3,5-dichlorophenyl)ketone, bis-(4-hydroxyphenyl)sulfide, bis-(4-hydroxyphenyl)sulfone, bis-(4-hydroxyphenyl)ether, and the like. These may be used singly or in a combination of two or more kinds.

Among these, 4,4'-dihydroxybiphenyl, hydroquinone, resorcin, 2,6-dihydroxynaphthalene, 2,2-bis(4-hydroxyphenyl)propane, and bis-(4-hydroxyphenyl)sulfone are preferably used from the viewpoint of their easy availability.

In the formula (III), $R_3$ is an optionally substituted arylene group.

The arylene group includes a phenylene group, a naphthalene group, a diphenylene group, and the like. These groups are optionally substituted with a halogen atom or an alkyl group with a carbon number of from 1 to 6.

The halogen atom and the alkyl group with a carbon number of from 1 to 6 include similar one to the above.

The aromatic dicarboxylic acid (III) includes terephthalic acid, isophthalic acid, 2,6-naphthalenedicarboxylic acid, 1,5-naphthalenedicarboxylic acid, 4,4'-biphenyldicarboxylic acid, methylterephthalic acid, methylisophthalic acid, and the like. These may be used singly or in a combination of two or more kinds.

Among these, terephthalic acid, isophthalic acid, and 2,6-naphthalenedicarboxylic acid are preferably used from the viewpoint of their easy availability.

In the formula (IV), $R_4$ and $R_5$ are each independently a hydrogen atom, a halogen atom, an acyloxy group with a carbon number of from 1 to 6, or an alkyl group with a carbon number of from 1 to 6.

The halogen atom, an acyloxy group with a carbon number of from 1 to 6, and the alkyl group with a carbon number of from 1 to 6 include similar one to the above.

The group of diaryl carbonate (IV) includes diphenyl carbonate, di-para-tolyl carbonate, di-para-chlorophenyl carbonate, phenyl-para-tolyl carbonate, and the like. Among these, diphenyl carbonate is preferably used. These diaryl carbonate compounds may be used singly or in a combination of two or more kinds.

The amount of the aromatic hydroxycarboxylic acid (I) used is preferably 30 to 80% by mole with respect to the total amount of the aromatic hydroxycarboxylic acid (I), the aromatic diol (II) and the aromatic dicarboxylic acid (III), more preferably 40 to 70% by mole, even more preferably 50 to 65% by mole.

The amount of the aromatic diol (II) used is preferably 35 to 10% by mole with respect to the total amount of the aromatic hydroxycarboxylic acid (I), the aromatic diol (II) and the aromatic dicarboxylic acid (III), more preferably 30 to 15% by mole, even more preferably 25 to 17.5% by mole.

The amount of the aromatic dicarboxylic acid (III) used is preferably 35 to 10% by mole with respect to the total amount of the aromatic hydroxycarboxylic acid (I), the aromatic diol (II) and the aromatic dicarboxylic acid (III), more preferably 30 to 15% by mole, even more preferably 25 to 17.5% by mole.

The mol ratio of the aromatic diol (II) to the aromatic dicarboxylic acid (III)((II)/(III)) is preferably 90/100 to 100/90. In the case where the mol ratio is less than 90/100 or more than 100/90, thermal resistance and flowability may tend to be deteriorated.

The amount of a diaryl carbonate (IV) used is preferably from 0.9 to 1.1 equivalent with respect to the total amount of the aromatic hydroxycarboxylic acid (I), the aromatic diol (II) and the aromatic dicarboxylic acid (III). In the case where the amount is less than 0.9 equivalent, the unreacted aromatic diol or aromatic dicarboxylic acid is sublimated during polymerization, so as to tend to plug lines or pipes of the reaction vessel, while the amount is more than 1.1 equivalent, liquid crystalline polyester obtained may tends to be notably colored.

The above-mentioned (I) to (IV) are preferably charged simultaneously in a reaction vessel at the initial stages of the reaction, and the diaryl carbonate (IV) may be dividedly added to the reaction vessel several times from the beginning of the reaction.

The melt-polymerization of the aromatic hydroxycarboxylic acid (I), the aromatic diol (II) and the aromatic dicarboxylic acid (III) with using diaryl carbonate (IV), if necessary, may be carried out in the presence of at least one selected from the group consisting of compounds represented by the formulae (VI), (VII) and (VIII).

At least one selected from the group consisting of compounds represented by the formulae (VI), (VII) and (VIII) is preferably charged simultaneously with the above-mentioned (I) to (IV) in a reaction vessel at the initial stages of the reaction, and the diaryl carbonate (IV) may be dividedly added to the reaction vessel several times from the beginning of the reaction.

In the formula of imidazole compound represented by the formula (VI),

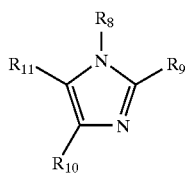

(VI)

$R_8$ to $R_{11}$ are each independently a hydrogen atom, an alkyl group with a carbon number of from 1 to 4, a hydroxymethyl group, a cyano group, a cyanoalkyl group with a carbon number of from 2 to 5, a cyanoalkoxy group with a carbon number of from 2 to 5, a carboxyl group, an amino group, an aminoalkyl group with a carbon number of from 1 to 4, an aminoalkoxy group with a carbon number of from 1 to 4, a phenyl group, a benzyl group, a phenylpropyl group, or a formyl group.

The alkyl group with a carbon number of from 1 to 4 includes a methyl group, an ethyl group, a propyl group, and the like. The cyanoalkyl group with a carbon number of from 2 to 5 includes a cyanomethyl group, a cyanoethyl group, a cyanopropyl group, and the like.

The cyanoalkoxy group with a carbon number of from 2 to 5 includes a cyanomethoxy group, a cyanoethoxy group, a cyanobutoxy group, and the like.

The aminoalkyl group with a carbon number of from 1 to 4 includes an aminomethyl group, an aminoethyl group, an aminopropyl group, and the like.

The aminoalkoxy group with a carbon number of from 1 to 4 includes an aminomethoxy group, an aminoethoxy group, an aminobutoxy group, and the like.

A specific example of the imidazole compound (VI) includes imidazole, 1-methylimidazole, 2-methylimidazole, 4-methylimidazole, 1-ethylimidazole, 2-ethylimidazole, 4-ethylimidazole, 1,2-dimethylimidazole, 1,4-dimethylimidazole, 2,4-dimethylimidazole, 1-methyl-2-ethylimidazole, 1-methyl-4-ethylimidazole, 1-ethyl-2-methylimidazole, 1-ethyl-2-ethylimidazole, 1-ethyl-2-phenylimidazole, 2-ethyl-4-methylimidazole, 2-phenylimidazole, 1-benzyl-2-methylimidazole, 2-phenyl-4-methylimidazole, 1-cyanoethyl-2-methylimidazole, 1-cyanoethyl-2-phenylimidazole, 4-cyanoethyl-2-ethyl-4-methylimidazole, 1-aminoethyl-2-methylimidazole, 2-alkyl-4-formylimidazole, 2,4-dialkyl-5-formylimidazole, 1-benzyl-2-phenylimidazole, 1-aminoethyl-2-methylimidazole, 1-aminoethyl-2-ethylimidazole, 4-formylimidazole, 2-methyl-4-formylimidazole, 4-methyl-5-formylimidazole, 2-ethyl-4-methyl-5-formylimidazole, 2-phenyl-4-methyl-4-formylimidazole, and the like. Among these, 1-methylimidazole and 2-methylimidazole are preferable from the viewpoint of their easy availability and handling with them.

In the formula of pyridine compound represented by the formula (VII),

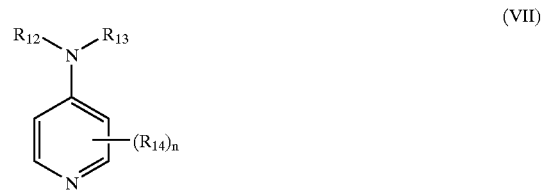

$R_{12}$ and $R_{13}$ are each independently a hydrogen atom, an alkyl group with a carbon number of from 1 to 6, a cycloalkyl group with a carbon number of from 5 to 10, an aryl group with a carbon number of from 6 to 12, or an aralkyl group with a carbon number of from 6 to 12, and $R_{12}$ and $R_{13}$ may be combined with each other. $R_{14}$ is an alkyl group with a carbon number of from 1 to 6, a cycloalkyl group with a carbon number of from 5 to 10, or an aryl group with a carbon number of from 6 to 12. n is an integer of from 1 to 4.

The alkyl group with a carbon number of from 1 to 6 includes similar one to the above.

The cycloalkyl group with a carbon number of from 5 to 10 includes a cyclohexyl group, a cyclopentyl group, and the like.

The aryl group with a carbon number of from 6 to 12 includes a phenyl group, a methylphenyl group, and the like.

The aralkyl group with a carbon number of from 6 to 12 includes a benzyl group, a phenylpropyl group, and the like.

A specific example of the pyridine compound (VII) includes 4-aminopyridine, 4-dimethylaminopyridine, 4-diethylaminopyridine, 4-pyrrolidinopyridine, 4-piperidinopyridine, 4-pyrrolinopyridine, 2-methyl-4-dimethylaminopyridine, and the like. Among these, 4-dimethylaminopyridine and 4-pyrrolidinopyridine are preferable.

In the formula of titanium compound represented by the formula (VIII),

$R_{15}$ is a hydrogen atom, an alkyl group with a carbon number of from 1 to 6, a cycloalkyl group with a carbon number of from 5 to 10, or an aryl group with a carbon number of from 6 to 12, $R_{16}$ is an aryl group with a carbon number of from 6 to 12, and m and 1 are an integer of from 0 to 4 and m+1 is 4.

A specific example of the titanium compound (VIII) includes tetraphenoxytitanium, butoxytriphenoxytitanium, dibutoxydiphenoxytitanium, tetrabutoxytitanium, tetracresoxytitanium, ethoxytricresoxytitanium, diethoxydicresoxytitanium, and the like. Among these, tetraphenoxytitanium and tetrabutoxytitanium are preferable.

While the above-mentioned compounds (VI) to (VIII) show superior catalytic activity even in the case of being singly used in the melt-polymerization, two or more of them may be used together as required. The amount of the above-mentioned compounds (VI) to (VIII) used (or total amount in the case of using together two or more of them) is preferably 10 to 5000 ppm to the total weight of the aromatic hydroxycarboxylic acid (I), the aromatic diol (II) and the aromatic dicarboxylic acid (III).

The temperature for the melt-polymerization is preferably about 180 to about 320° C. during the initial stage of the melt-polymerization and preferably reach about 280 to about 400° C. during the final stage by heating at a rate of 0.3 to 5.0° C./min. It is preferable to polymerize while removing phenol, which is by-produced through the polymerization, from the reaction system.

The melt-polymerization is preferably conducted under an inert gas atmosphere such as nitrogen gas and argon at normal pressure. The melt-polymerization may also be performed under a reduced pressure.

The reaction time of the melt-polymerization is, not particularly restricted, approximately 0.3 to 10 hours in general.

After the liquid crystalline polyester produced by melt-polymerizing may be solidified, if necessary, the liquid crystalline polyester powder obtained by grinding the solidified polyester may be further polymerized in the solid phase. The solid-phase polymerization can be performed under either atmosphere of normal pressure or a reduced pressure. Also, a reactor used for the solid-phase polymerization includes a batch reactor, a continuous reactor, and the like.

A method for the solid-phase polymerization includes a method such that the liquid crystalline polyester powder is mixed in a high-boiling solvent such as diphenyl sulfone or a mixture of diphenyl and diphenyl ether and then the reaction mixture is heated so as to remove the high-boiling solvent, a method such that the liquid crystalline polyester powder is transformed, for example, pelletized by a granulator and is conducted a heat-treatment under an inert gas atmosphere or under a reduced pressure, and the like.

The temperature of the heating and the heat-treatment is approximately from 200 to 350° C. in general, and the treating time is approximately from 1 to 20 hours in general. An apparatus for the heat-treating includes known drier, reactor, inert oven, mixer, electric furnace, and the like.

The weight-average molecular weight of the liquid crystalline polyester thus obtained is, not particularly restricted, preferably 10000 to 50000.

It can be confirmed, for example, by the observation through a polarizing microscope that the polyester obtained shows liquid crystal phase.

The liquid crystalline polyester of the present invention can be made into molded articles, for example, by a method of melt-molding such as injection molding.

The liquid crystalline polyester of the present invention is characterized by containing a structural unit derived from the aromatic hydroxycarboxylic acid (I), a structural unit derived from the aromatic diol (II) and a structural unit derived from the aromatic dicarboxylic acid (III), and not substantially containing fatty acid or fatty acid anhydride.

Here, the fatty acid includes acetic acid, propionic acid, butyric acid, isobutyric acid, valeric acid, pivalic acid, 2-ethyl hexoic acid, monochloroacetic acid, dichloroacetic acid, trichloroacetic acid, monobromoacetic acid, dibromoacetic acid, tribromoacetic acid, monofluoroacetic acid, difluoroacetic acid, trifluoroacetic acid, glutaric acid, maleic acid, succinic acid, β-bromopropionic acid, and the like.

The fatty acid anhydride involves acetic anhydride, propionic anhydride, butyric anhydride, isobutyric anhydride, valeric anhydride, pivalic anhydride, 2-ethyl hexoic anhydride, monochloroacetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride, trifluoroacetic anhydride, glutaric anhydride, maleic anhydride, succinicanhydride, β-bromopropionicanhydride, and the like.

The liquid crystalline polyester obtained by the method of the present invention is superior in heat resistance, moldability and mechanical strength (such as tensile strength and impact strength), and also gives molded articles without generating fatty acid gas such as acetic acid gas. Therefore it is suitably used for materials with a high heat resistance such as electronic parts and electrical parts.

EXAMPLES

The present invention is herein after described on the basis of examples; however, the present invention is not restricted to the examples.

Heat deflection temperature (the index of thermal resistance), thin-wall flow length (the index of moldability) and the amount of generating gas were measured in the following manners.

(1) Heat Deflection Temperature

A test piece having a length of 127 mm, a width of 12.7 mm and a thickness of 6.4 mm was used for measuring under a load of 18.6 kg/cm$^2$ in accordance with ASTMD648.

The heat resistance was evaluated by measuring the temperature at which the test piece shows a constant distortion under a constant load.

(2) Thin-wall Flow Length

The injection molding machine of PS40E5ASE type manufactured by NISSEI PLASTIC INDUSTRIAL CO., LTD. was used, and a metal mold for measuring thin-wall flow length as shown in FIG. 1 was used. The temperature of a cylinder was set at 350° C. and the temperature of the metal mold was set at 130° C.

Pellets which were produced by the twin-screw extruder (PCM-30 manufactured by IKEGAI TEKKOU CO., LTD.) were provided to the injection molding machine. Molten resin which was injected out from a nozzle at the cylinder tip passed through a sprue (1) of the metal mold to be filled into four cavities (4) in FIG. 1 through a runner (2) and a gate (3). Thereafter the molten resin cooled to be solidified, so that a molded article was obtained. The molded article was taken out so as to measure the length (in the direction of flow) of the resin filled into each of the four cavities. The average thereof was calculated to be regarded as thin-wall flow length (mm). The higher value of the thin-wall flow length results in the more superior thin-wall moldability.

The molding processability of the resin was evaluated by comparing the length of the flowing resin when molded under the same conditions.

(3) The Amount of Generating Acetic Acid Gas 5 g of test piece formed into dumbbell (½)×0.8 mmt prescribed by JIS K71131 (½) was measured and sealed into a glass bottle and thereafter heat-treated at a temperature of 120° C. for 20 hours so as to measure the total amount of generating acetic acid gas with a headspace gas chromatograph (GC15A/HSS3A manufactured by SHIMADZU CORPORATION).

Example 1

663 g (4.8 mol) of para-hydroxybenzoic acid, 298 g (1.6 mol) of 4,4'-dihydroxybiphenyl, 199 g (1.2 mol) of terephthalic acid, 67 g (0.4 mol) of isophthalic acid, and 1714 g (8.0 mol) of diphenyl carbonate were charged in a reaction vessel equipped with a stirrer, a torque meter, a nitrogen gas introduction line, a thermometer, and a reflux cooler. After being sufficiently replaced atmosphere in the reaction vessel with nitrogen gas, the inside thereof was heated to 200° C. for 15 minutes under nitrogen gas flow and additionally heated to 220° C. for 30 minutes and the inside temperature was maintained at 220° C. to be refluxed for 3 hours.

Then, after adding 1.3 g of 1-methylimidazole, the inside thereof was heated to 340° C. for 100 minutes while evaporating distilling by-produced phenol and unreacted diphenyl carbonate, was maintained at a temperature of 340° C. for 2 hours. And the reaction was regarded as completed, than the contents were taken out. The solid content thus obtained was cooled to room temperature, ground by a rough grinder, heated from room temperature to 250° C. for 1 hour under nitrogen gas atmosphere, additionally heated from 250° C. to 261° C. for 5 hours, and then maintained at a temperature of 261° C. for 3 hours so that the solid-phase polymerization was performed. When liquid crystallinity of the resin obtained was measured by a polarizing microscope, the resin was found to be liquid crystalline polyester forming molten phase having optical anisotropy.

The resin obtained was mixed with 40% by weight of milled glass (REV-8) manufactured by ASAHI GLASS CO., LTD. and thereafter granulated by using the twin-screw extruder (PCM-30 manufactured by IKEGAI TEKKOU CO., LTD.) at a temperature of 340° C. The pellets obtained was injection-molded by using the injection molding machine of PS40E5ASE type manufactured by NISSEI PLASTIC INDUSTRIAL CO., LTD. at a cylinder temperature of 350° C. and a metal mold temperature of 130° C., so that the properties (heat deflection temperature and the amount of generating gas) of the resin was evaluated. The results are shown in Table 1.

Example 2

The resin was obtained in the same manner as Example 1, expect that N,N-dimethylaminopyridine was used instead of 1-methylimidazole and the conditions of the solid-phase polymerization were modified into the conditions described in Table 1. Each of the measurements was performed. The results are shown in Table 1.

Also, when liquid crystallinity of the resin obtained was measured by a polarizing microscope, the resin was found to be liquid crystalline polyester forming molten phase having optical anisotropy similarly to Example 1.

Example 3

The resin was obtained in the same manner as Example 1 except that tetrabutoxytitanium was used instead of 1-methylimidazole and the conditions of the solid-phase polymerization were modified into the conditions described in Table 1. Each of the measurements was performed. The results are shown in Table 1.

Also, when liquid crystallinity of the resin obtained was measured by a polarizing microscope, the resin was liquid crystalline polyester forming molten phase having optical anisotropy similarly to Example 1.

Comparative Example 1

911 g (6.6 mol) of para-hydroxybenzoic acid, 409 g (2.2 mol) of 4,4'-dihydroxybiphenyl, 274 g (1.65 mol) of terephthalic acid, 91 g (0.55 mol) of isophthalic acid, and 1235 g (12.1 mol) of acetic anhydride were charged in a reaction vessel equipped with a stirrer, a torque meter, a nitrogen gas introduction line, a thermometer, and a reflux cooler. After being sufficiently replaced atmosphere in the reaction vessel with nitrogen gas, the inside thereof was heated to 150° C. for 15 minutes under nitrogen gas flow and the inside temperature was maintained at to be refluxed for 3 hours.

Then, the inside thereof was heated to 320° C. for 2 hours and 50 minutes while evaporating distilling by-produced acetic acid and unreacted acetic anhydride, and the reaction was regarded as completed at the point of time when the rise of torque was observed, then the contents were taken out. The solid content thus obtained was cooled to room temperature, ground by a rough grinder, heated from room temperature to 250° C. for 1 hour under nitrogen gas atmosphere, additionally heated from 250° C. to 280° C. for 5 hours, and then maintained at a temperature of 280° C. for 3 hours so that the solid-phase polymerization was performed.

The resin obtained was mixed with 40% by weight of milled glass (EFH-7501) manufactured by CENTRAL GLASS CO., LTD. and thereafter granulated by using the twin-screw extruder (PCM-30 manufactured by IKEGAI TEKKOU CO., LTD.) at a temperature of 340° C. The pellets obtained was injection-molded by using the injection molding machine of PS40E5ASE type manufactured by NISSEI PLASTIC INDUSTRIAL CO., LTD. at a cylinder temperature of 350° C. and a metal mold temperature of 130° C., so that the properties (tensile strength, impact strength and heat deflection temperature) of the resin was evaluated. The results are shown in Table 1.

TABLE 1

|  |  | Example 1 | Example 2 | Example 3 | Comparative Example 1 |
|---|---|---|---|---|---|
| Raw Materials | PHBA (mol) | 4.8 | 4.8 | 4.8 | 6.6 |
|  | DHB (mol) | 1.6 | 1.6 | 1.6 | 2.2 |
|  | TP (mol) | 1.2 | 1.2 | 1.2 | 1.65 |
|  | IP (mol) | 0.4 | 0.4 | 0.4 | 0.55 |
|  | Diphenyl Carbonate (mol) | 8.0 | 8.0 | 8.0 |  |
|  | Acetic Anhydride (mol) |  |  |  | 12.1 |
|  | 1-MI (g) | 1.2 |  |  |  |
|  | DMAP (g) |  | 0.2 |  |  |
|  | Ti (OBu)$_4$ (g) |  |  | 1.0 |  |

TABLE 1-continued

|  | Example 1 | Example 2 | Example 3 | Comparative Example 1 |
|---|---|---|---|---|
| Solid-phase Polymerization Temperature (° C.) | 246 | 235 | 289 | 280 |
| Load Deflection Temperature (° C.) | 261 | 261 | 254 | 265 |
| Thin-wall Flow Length (mm) | 24 | 25 | 24 | 23 |
| The Quantity of Occurring Acetic Acid Gas (ppm) | 0 | 0 | 0 | 1.3 |

PHBA: para-hydroxybenzoic acid
DHB: 4,4'-dihydroxybiphenyl
TP: terephthalic acid
IP: isophthalic acid
1 MI: 1-methylimidazole
DMAP: N, N-dimethylaminopyridine
Ti (OBu) 4: Tetrabutoxytitanium The present invention can provide liquid crystalline polyester which gives molded articles without generating acetic acid gas, and a method for producing the liquid crystalline polyester.

What is claimed is:

1. A method for producing a liquid crystalline polyester comprising melt-polymerizing aromatic hydroxycarboxylic acid represented by the formula (I), aromatic diol represented by the formula (II), and aromatic dicarboxylic acid represented by the formula (III) with a diaryl carbonate represented by the formula (IV):

HO—$R_1$—COOH (I)

HO—$R_2$—OH (II)

HOOC—$R_3$—COOH (III)

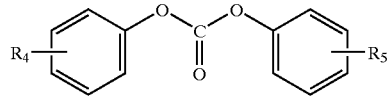

(IV)

wherein, $R_1$ and $R_3$ are an optionally substituted arylene group, $R_2$ is an optionally substituted arylene group or a group represented by the formula (V),

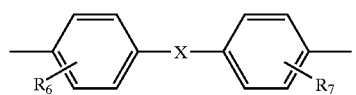

(V)

wherein $R_4$ to $R_7$ are each independently a hydrogen atom, a halogen atom, an acyloxy group with a carbon number of from 1 to 6, or an alkyl group with a carbon number of from 1 to 6, and X is —O—, —S—, —$SO_2$—, —CO—, —$C_6H_{10}$—, or an alkylene group, and
  wherein the melt-polymerization is carried out in the presence of at least one compound selected from the group consisting of 1-methylimidazole, 2-methylimidazole, and a pyridine compound represented by the formula (VII):

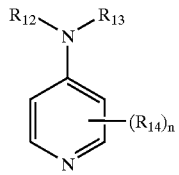

(VII)

wherein $R_{12}$ and $R_{13}$ are each independently a hydrogen atom, an alkyl group with a carbon number of from 1 to 6, a cycloalkyl group with a carbon number of from 5 to 10, an aryl group with a carbon number of from 6 to 12, or an aralkyl group with a carbon number of from 6 to 12, and $R_{12}$ and $R_{13}$ may be combined with each other, $R_{14}$ is an alkyl group with a carbon number of from 1 to 6, a cycloalkyl group with a carbon number of from 5 to 10, an aryl group with a carbon number of from 6 to 12, or an aralkyl group with a carbon number of from 6 to 12, and n is an integer of from 1 to 4, and
  solid-polymerizing the liquid crystalline polyester produced by the melt-polymerizing.

2. The method according to claim 1, wherein melt-polymerization is carried out in a presence of imidazole compound represented by the formula (VI):

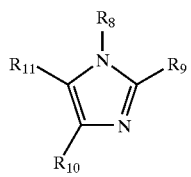

(VI)

wherein, $R_8$ to $R_{11}$ are each independently a hydrogen atom, an alkyl group with a carbon number of from 1 to 4, a hydroxymethyl group, a cyano group, a cyanoalkyl group with a carbon number of from 2 to 5, a cyanoalkoxy group with a carbon number of from 2 to 5, a carboxyl group, an amino group, an aminoalkyl group with a carbon number of from 1 to 4, an aminoalkoxy group with a carbon number of from 1 to 4, a phenyl group, a benzyl group, a phenylpropyl group, or a formyl group.

3. The method according to claim 1, wherein the melt-polymerization is carried out in a presence of pyridine compound represented by the formula (VII):

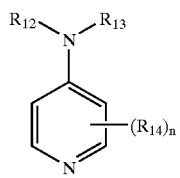

(VII)

wherein $R_{12}$ and $R_{13}$ are each independently a hydrogen atom, an alkyl group with a carbon number of from 1 to 6, a cycloalkyl group with a carbon number of from 5 to 10, an aryl group with a carbon number of from 6 to 12, or an aralkyl group with a carbon number of from 6 to 12, and $R_{12}$ and $R_{13}$ may be combined with each other, $R_{14}$ is an alkyl group with a carbon number of from 1 to 6, a cycloalkyl group with a carbon number of from 5 to 10, an aryl group with a carbon number of from 6 to 12, or an aralkyl group with a carbon number of from 6 to 12, and n is an integer of from 1 to 4.

4. The method according to claim 1, wherein the aromatic hydroxycarboxylic acid (I) is from 30 to 80% by mole of a total 5 of the aromatic hydroxycarboxylic acid (I), the aromatic diol (II) and the aromatic dicarboxylic acid (III), and a mol ratio of the aromatic diol (II) to the aromatic dicarboxylic acid (III) ((II)/(III)) is 90/100 to 100/90.

* * * * *